United States Patent
Hsieh et al.

(10) Patent No.: US 8,808,862 B2
(45) Date of Patent: Aug. 19, 2014

(54) RESIN COMPOSITION FOR INSULATION FILM

(71) Applicant: Elite Material Co., Ltd., Tao-Yuan Hsien (TW)

(72) Inventors: Chen-Yu Hsieh, Taoyuan County (TW); Yi-Fei Yu, Taoyuan County (TW)

(73) Assignee: Elite Material Co., Ltd., Tao-Yuan Hsien (TW)

( * ) Notice: Subject to any disclaimer, the term of this patent is extended or adjusted under 35 U.S.C. 154(b) by 111 days.

(21) Appl. No.: 13/730,012

(22) Filed: Dec. 28, 2012

(65) Prior Publication Data

US 2013/0245161 A1    Sep. 19, 2013

(30) Foreign Application Priority Data

Mar. 13, 2012 (TW) .............. 101108453 A

(51) Int. Cl.
| | | |
|---|---|---|
| *B32B 27/38* | (2006.01) | |
| *C09D 163/00* | (2006.01) | |
| *C09D 151/00* | (2006.01) | |
| *C08L 63/00* | (2006.01) | |
| *C08L 51/00* | (2006.01) | |
| *C08K 5/08* | (2006.01) | |
| *C08K 5/315* | (2006.01) | |
| *B32B 15/092* | (2006.01) | |

(52) U.S. Cl.
CPC .............. *C09D 163/00* (2013.01); *C08L 63/00* (2013.01); *Y10S 428/901* (2013.01)
USPC .............. 428/413; 428/901; 525/65; 525/66; 523/436

(58) Field of Classification Search
None
See application file for complete search history.

(56) References Cited

U.S. PATENT DOCUMENTS

2003/0198823 A1* 10/2003 Sharma et al. ................ 428/482
2007/0178300 A1*  8/2007 Amla et al. .................... 428/332

FOREIGN PATENT DOCUMENTS

JP         02124919 A  *  5/1990  ............. C08G 59/18

OTHER PUBLICATIONS

Abstract of JP 02124919 A, provided by the JPO (no date).*
Abstract of JP 02124919 A, provided by Derwent (no date).*

* cited by examiner

*Primary Examiner* — Michael J Feely
(74) *Attorney, Agent, or Firm* — WPAT, P.C.; Anthony King

(57) ABSTRACT

A resin composition includes (A) 100 parts by weight of epoxy resin; (B) 20 to 100 parts by weight of polybutadiene styrene divinylbenzene graft terpolymer resin; (C) 2 to 20 parts by weight of di-tert-butylhydroquinone (DTBHQ); (D) 5 to 50 parts by weight of polyphenyl ether modified cyanate ester resin; and at least one of (E) inorganic filler, (F) chain extending sealing agent, and (G) catalyst. The resin composition is characterized by specific ingredients and proportions thereof to attain high heat resistance, low dielectric constant Dk, and low dielectric dissipation factor Df, and being halogen-free, and therefore is applicable to protective film of printed circuit boards, insulating protective film of electronic components, and resin insulation film of leadframes.

13 Claims, No Drawings

RESIN COMPOSITION FOR INSULATION FILM

CROSS-REFERENCE TO RELATED APPLICATION

This non-provisional application claims priority under 35 U.S.C. §119(a) on Patent Application No(s). 101108453 filed in Taiwan, R.O.C. on Mar. 13, 2012, the entire contents of which are hereby incorporated by reference.

FIELD OF THE INVENTION

The present invention relates to resin compositions, and more particularly, to a resin composition for an insulation film.

BACKGROUND OF THE INVENTION

To get in line with the global trend of environmental protection, and eco-friendly regulations, electronic product manufacturers nowadays are developing, and manufacturing halogen-free electronic products. Advanced countries, and electronic manufacturing giants set forth schedules of launching mass production of halogen-free electronic products. As a result of the promulgation of the Restriction of Hazardous Substances (RoHS) by the European Union, hazardous substances, such as lead, cadmium, mercury, hexavalent chromium, poly-brominated biphenyl (PBB), and poly-brominated diphenyl ether (PBDE), are strictly prohibited from being used in manufacturing electronic products or their parts, and components. A printed circuit board (PCB) is an indispensable, and fundamental basis of the semiconductor industry, and electronic industry; hence, printed circuit boards bore the brunt of international halogen-free regulations when international organizations set forth strict requirements of the halogen content of printed circuit boards. For example, the International Electrotechnical Commission (IEC) 61249-2-21 requires that bromide content, and chloride content shall be less than 900 ppm, and the total halogen content shall be less than 1500 ppm. The Japan Electronics Packaging, and Circuits Association (JPCA) requires that both bromide content, and chloride content shall be less than 900 ppm. To enforce its green policies, Greenpeace calls on manufacturers worldwide to get rid of polyvinyl chloride (PVC), and brominated flame retardants (BFRs) from their electronic products in order to conform with the lead-free, and halogen-free requirements of green electronics. Hence, the industrial sector nowadays is interested in rendering related materials halogen-free, and sees this technique as one of its key research topics.

Electronic products nowadays have the trend toward compactness, and high-frequency transmission; hence, circuit boards nowadays typically feature a high-density layout, and increasingly strict material requirements. To mount high-frequency electronic components on a circuit board, it is necessary that the substrate of the circuit board is made of a material of a low dielectric constant Dk, and dielectric dissipation factor Df in order to maintain the transmission speed, and the integrity of a signal transmitted. To allow the electronic components to operate well at a high temperature, and a high-humidity environment, it is necessary for the circuit board to be heat resistant, fire resistant, and of low hygroscopicity. Epoxy resin is adhesive, heat resistant, and malleable, and thus is widely applicable to encapsulants, and copper clad laminates (CCL) of electronic components, and machinery. An important factor in the enhancement of heat resistance and flame retardation and assurance of a low dielectric dissipation factor, low hygroscopicity, high cross-linking density, high glass transition temperature, high connectivity, appropriate thermal expansion of circuit boards lies in the selection of an epoxy resin, a curing agent, and a reinforcement material.

Due to rapid development of communication and broadband technology, wide use of cloud computing, and application of high-speed transmission, conventional materials (for example, FR-4) for manufacturing printed circuit boards no longer meet the demand for advanced application, especially the requirements for high-frequency printed circuit boards. Basically, to attain high-frequency printed circuit board high frequency and high-speed electronic transmission characteristics, and yet prevent data loss or interference while transmission is underway, the substrate material used has to conform to the process technology and meet market and application needs in terms of electrical properties, heat resistance, hygroscopicity, mechanical properties, dimension stability, and chemical tolerance. As regards electrical properties, considerations should be given to the dielectric constant Dk and dielectric dissipation factor Df of the material. In general, the signal transmission speed of a copperclad laminate is inversely proportional to the square root of the dielectric constant Dk of the material from which the copperclad laminate is made, and thus the minimization of the dielectric constant Dk of the substrate material is usually advantageously important. The lower the dielectric dissipation factor Df is, the lesser the signal transmission attenuation is; hence, a material of a low dielectric dissipation factor Df provides satisfactory transmission quality.

A conventional insulation film of a printed circuit board essentially consists of a polymeric protective film and an adhesive film. To render the printed circuit board commercially available, it is necessary to adhere a release paper to the adhesive film; hence, the adhesive film is also known as back film. Applications of the back film mainly include protective film of flexible printed circuit boards, insulating protective film of electronic components, and back insulation film of leadframes. Since the aforesaid applications involve a high-temperature process of printed circuit boards, the back film usually includes a polymeric protective film made from polyimide that demonstrates tolerance to high temperature. Furthermore, epoxy resin has excellent electrical characteristics, mechanical strength, and chemical tolerance, and manifests high adhesive capacity toward copper foil and polyimide film, and therefore is often used as an adhesive material for making polyimide-based back film. Therefore, the back film of printed circuit boards is essentially a polyimide-based protective film and has an adhesive made of epoxy resin. Printed circuit boards in operation generate heat, whereas the temperature and humidity in workplace affect the performance and stability of the adhesive; hence, the adhesive not only has to tolerate high temperature and a chemical solvent, but also has to manifest mechanical properties of flexibility and high strength, otherwise heat resistance and stability of the adhesive will compromise the performance of the printed circuit boards. Therefore, resin composition research and development (R&D) has a trend toward achieving high glass transition temperature and low dielectric properties.

Accordingly, it is imperative for printed circuit board material suppliers to develop a material of high heat resistance, low dielectric constant Dk, and low dielectric dissipation factor Df, and being halogen-free, and applies it to the manufacturing of printed circuit boards.

SUMMARY OF THE INVENTION

In view of the aforesaid drawbacks of the prior art, the inventor of the present invention conceived room for improvement in the prior art and thus conducted extensive researches and experiments according to the inventor's years of experience in the related industry, and finally developed a resin composition for an insulation film as disclosed in the present invention with a view to achieving high heat resistance, low dielectric constant Dk, and low dielectric dissipation factor Df, and being halogen-free.

It is an objective of the present invention to provide a resin composition characterized by specific ingredients and proportions thereof to attain high heat resistance, low dielectric constant (Dk), low dielectric dissipation factor (Df), and being halogen-free, and therefore is applicable to protective film of printed circuit boards, insulating protective film of electronic components, and resin insulation film of leadframes.

In order to achieve the above and other objectives, the present invention provides a resin composition comprising: (A) 100 parts by weight of epoxy resin; (B) 20 to 100 parts by weight of polybutadiene styrene divinylbenzene graft terpolymer resin; (C) 2 to 20 parts by weight of di-tert-butylhydroquinone (DTBHQ); (D) 5 to 50 parts by weight of polyphenyl ether modified cyanate ester resin; and at least one of (E) inorganic filler, (F) chain extending sealing agent, and (G) a catalyst.

As regards the composition described above, wherein the (E) inorganic filler is contained in an amount of 10 to 150 parts by weight.

As regards the composition described above, wherein the (F) chain extending sealing agent is contained in an amount of 0.1 to 25 parts by weight.

As regards the composition described above, wherein the (G) catalyst is contained in an amount of 0.001 to 10 parts by weight.

As regards the composition described above, wherein the polyphenyl ether modified cyanate ester resin results from substituting a cyanate ester group for a hydroxyl group of the terminal functional group of polyphenyl ether resin to thereby manifest the low dielectric characteristics of the polyphenyl ether resin and the reactivity of the cyanate ester group. For example, commercial available BTP-6020S resin is manufactured by Lonza.

As regards the composition, wherein the polybutadiene styrene divinylbenzene graft terpolymer resin has low dielectric characteristics preferably.

As regards the resin composition, a cross-linking reaction between polyphenyl ether modified cyanate ester resin and polybutadiene styrene divinylbenzene graft terpolymer takes place, such that a cross-linked product of the cross-linking reaction manifests low dielectric characteristics (low Dk and low Df). According to the prior art, it is difficult that a cross-linking reaction can occur between polyphenyl ether resin and polybutadiene styrene divinylbenzene graft terpolymer. By contrast, the resin composition of the present invention enables a polyphenyl ether resin terminated with a cyanate ester group, such that the cyanate ester group undergoes a cross-linking reaction with the polybutadiene styrene divinylbenzene graft terpolymer, wherein, preferably, a peroxide and a polymerization inhibitor are added, such that the polyphenyl ether resin terminated with the cyanate ester group undergoes the cross-linking reaction with the polybutadiene styrene divinylbenzene graft terpolymer more quickly.

As regards the composition, wherein the di-tert-butylhydroquinone (DTBHQ) is a polymerization inhibitor.

As regards the composition, the epoxy resin comprises at least one selected from the group consisting of bisphenol A epoxy resin, bisphenol F epoxy resin, bisphenol S epoxy resin, phenol novolac epoxy resin, bisphenol A novolac epoxy resin, o-cresol novolac epoxy resin, trifunctional epoxy resin, tetrafunctional epoxy resin, multifunctional epoxy resin, dicyclopentadiene (DCPD) epoxy resin, phosphorus-containing epoxy resin, p-xylene epoxy resin, naphthalene epoxy resin, benzopyran epoxy resin, biphenyl novolac epoxy resin, phenol aralkyl novolac epoxy resin, silicon-containing epoxy resin, fluorine-containing epoxy resin, boron-containing epoxy resin, titanium-containing epoxy resin, epoxidized polybutadiene resin, polyester epoxy resin, and maleimide-containing epoxy resin.

As regards the composition, the inorganic filler comprises at least one selected from the group consisting of silicon dioxide, aluminum oxide, aluminum hydroxide, magnesium oxide, magnesium hydroxide, calcium carbonate, aluminum nitride, boron nitride, aluminum silicon carbide, silicon carbide, sodium carbonate, titanium dioxide, zinc oxide, zirconium oxide, quartz, diamond powder, diamond-like powder, graphite, magnesium carbonate, potassium titanate, ceramic fiber, mica, boehmite, zinc molybdate, ammonium molybdate, zinc borate, calcium phosphate, calcinated talc, talc, silicon nitride, mullite, calcinated kaolin clay, clay, basic magnesium sulfate whisker, mullite whisker, barium sulfate, magnesium hydroxide whisker, magnesium oxide whisker, calcium oxide whisker, carbon nanotube, and powder particles having an organic core and a shell modified by an insulator.

The inorganic filler comes in the form of a spherical shape, a fiber-like shape, board-like shape, particulate shape, strip-like shape, or needle-like shape, and is selectively pre-treated with a silane coupling agent. The inorganic filler can be in the form of particulate powder of a diameter of less than 100 μm or preferably a diameter of 1 nm to 20 μm, or most preferably nanoscale particulate powder of a diameter of less than 1 μm. The needle-shaped inorganic filler is in the form of powder, whose particles each having a diameter of less than 50 μm and a length of 1 to 200 μm.

As regards the composition, the silicon dioxide preferably comprises at least one selected from the group consisting of hollow porous spherical silicon dioxide and solid porous spherical silicon dioxide.

As regards the composition, the chemical structure of the chain extending sealing agent is expressed by at least one selected from the group consisting of:

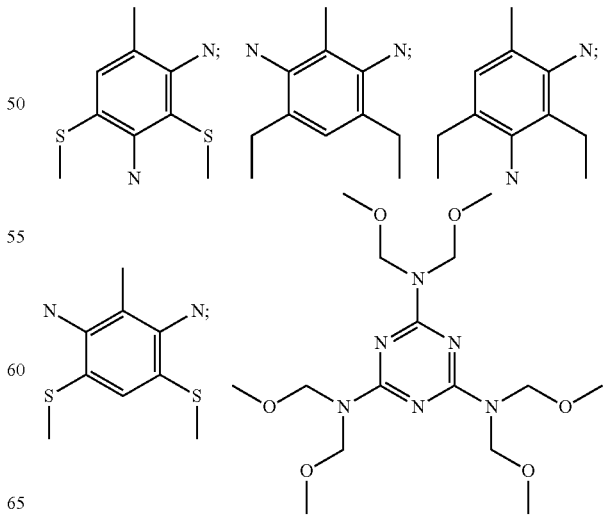

As regards the composition, the catalyst comprises at least one selected from the group consisting of phenylphosphine borate catalyst, boron trifluoride amine complex, ethyltriphenyl phosphonium chloride, 2-methylimidazole (2MI), 2-phenylimidazole (2PZ), 2-ethyl-4-methylimidazole (2E4MI), triphenylphosphine (TPP), 4-dimethylaminopyridine (DMAP), urea catalyst, imidazole epoxy complex, and metallic salts of manganese, iron, cobalt, nickel, copper, or zinc.

As regards the resin composition, the phenylphosphine borate catalyst preferably is tetraphenylphosphonium tetraphenylborate.

The resin composition of the present invention further comprises a peroxide and/or a solvent.

An organic solvent for dissolving the resin composition of the present invention comprises methanol, ethanol, ethylene glycol monomethyl ether, acetone, butone (methyl ethyl ketone), methyl isobutyl ketone, cyclohexanone, toluene, xylene, methoxyethyl acetate, ethoxyethyl acetate, propoxyethyl acetate, ethyl acetate, dimethyl formamide, dimethyl acetamide, propylene glycol methyl ether, or a mixture thereof.

Another objective of the present invention is to provide an insulation film comprising the resin composition described above. The insulation film is formed on polyester film (PET film) or polyimide film (PI film), or is coated on copper foil (resin coated copper, RCC) before being baked and heated.

Yet another objective of the present invention is to provide a circuit board comprising the insulation film.

The insulation film and the circuit board are manufactured by a conventional method and therefore is not described in detail herein for the sake of brevity.

To further disclose the present invention and enable persons skilled in the art to implement the present invention accordingly, the present invention is hereunder illustrated with several embodiments. However, persons skilled in the art should understand that the embodiments below are illustrative of the present invention only, but should not be interpreted as restrictive of the scope of the present invention. Hence, all equivalent modifications and changes made to the embodiments below without departing from the spirit embodied in the present invention should fall within the scope of the present invention.

BRIEF DESCRIPTION OF THE DRAWINGS

None.

DETAILED DESCRIPTION OF THE PREFERRED EMBODIMENTS

Objectives, features, and advantages of the present invention are hereunder illustrated with specific embodiments.

Embodiment 1

Dissolve 20 g of polybutadiene styrene divinylbenzene graft terpolymer resin (Ricon 257) in 180 g of toluene to prepare a 10% toluene solution. Put 100 g of epoxy resin (HP-6000), 6 g of di-tert-butylhydroquinone (DTBHQ), 15 g of polyphenyl ether modified cyanate ester resin (BTP-6020S), 50 g of spherical silicon dioxide (Suzuki oil B-6C) functioning as inorganic filler, 10 g of aqueous talc powder (inorganic filler), 4 g of chain extending sealing agent (ethacure 100), 0.5 g of tetraphenylphosphonium tetraphenylborate (catalyst) and 0.008 g of cobalt naphthenate (catalyst), 2 g of dicumyl peroxide (DCP), and 3 g of di-tert-butyl peroxide (perbutyl D) in a 1000 ml reaction flask in sequence. Then, put 200 g of 10 wt % Ricon 257-containing toluene solution in the reaction flask described above to prepare the well-distributed resin composition.

Embodiment 2

Dissolve 30 g of polybutadiene styrene divinylbenzene graft terpolymer resin (Ricon 257) in 170 g of toluene to prepare a 15% toluene solution. Put 100 g of epoxy resin (PB-3600), 2 g of di-tert-butylhydroquinone (DTBHQ), 30 g of polyphenyl ether modified cyanate ester resin (BTP-6020S), 100 g of spherical silicon dioxide (Suzuki oil B-6C) functioning as inorganic filler, 10 g of aqueous talc powder (inorganic filler), 4 g of chain extending sealing agent (ethacure 100), 0.5 g of tetraphenylphosphonium tetraphenylborate (catalyst) and 0.008 g of cobalt naphthenate (catalyst), 2 g of dicumyl peroxide (DCP), and 3 g of di-tert-butyl peroxide (perbutyl D) in a 1000 ml reaction flask in sequence. Then, put 200 g of 15 wt % Ricon 257-containing toluene solution in the reaction flask described above to prepare the well-distributed resin composition.

Embodiment 3

Dissolve 40 g of polybutadiene styrene divinylbenzene graft terpolymer resin (Ricon 257) in 160 g of toluene to prepare a 20% toluene solution. Put 100 g of epoxy resin (NC-3000), 6 g of di-tert-butylhydroquinone (DTBHQ), 45 g of polyphenyl ether modified cyanate ester resin (BTP-6020S), 120 g of spherical silicon dioxide (Suzuki oil B-6C) functioning as inorganic filler, 10 g of aqueous talc powder (inorganic filler), 4 g of chain extending sealing agent (ethacure 100), 0.5 g of tetraphenylphosphonium tetraphenylborate (catalyst) and 0.008 g of cobalt naphthenate (catalyst), 2 g of dicumyl peroxide (DCP), and 3 g of di-tert-butyl peroxide (perbutyl D) in a 1000 ml reaction flask in sequence. Then, put 200 g of 20 wt % Ricon 257-containing toluene solution in the reaction flask described above to prepare the well-distributed resin composition.

Comparison 1

Dissolve 40 g of carboxylated nitrile butadiene rubber (1072CG) in 160 g of methyl ethyl ketone (MEK) to prepare a 20% methyl ethyl ketone (MEK) solution. Put 100 g of epoxy resin (XD-1000), 26 g of di-tert-butylhydroquinone (DTBHQ), 90 g of aluminum hydroxide (inorganic filler), 10 g of aqueous talc powder (inorganic filler), 4 g of chain extending sealing agent (Cymel 303), and 0.25 g of tetraphenylphosphonium tetraphenylborate (catalyst) in a 1000 ml reaction flask in sequence. Then, put 200 g of 1072CG-containing methyl ethyl ketone (MEK) solution in the reaction flask described above to prepare the well-distributed resin composition.

Comparison 2

Dissolve 40 g of carboxylated nitrile butadiene rubber (1072CG) in 160 g of methyl ethyl ketone (MEK) to prepare a 20% methyl ethyl ketone (MEK) solution. Put 100 g of epoxy resin (NC-3000), 6 g of di-tert-butylhydroquinone (DTBHQ), 90 g of aluminum hydroxide (inorganic filler), 10 g of aqueous talc powder (inorganic filler), 4 g of chain extending sealing agent (Cymel 303), and 0.25 g of tetraphenylphosphonium tetraphenylborate (catalyst) in a 1000 ml reaction flask in sequence. Then, put 200 g of 1072CG-containing methyl ethyl ketone (MEK) solution in the reaction flask described above to prepare the well-distributed the resin composition.

A slide with 25 μm thick is coated with the resin composition prepared in embodiments 1, 2, 3 and comparisons 1, 2 to perform tests thereon for evaluating the peel strength, coefficient of thermal expansion (CTE), dielectric constant (Dk), and dielectric dissipation factor (Df) of the resin composition. The test results are shown in Table 1.

TABLE 1

|  | embodiment 1 | embodiment 2 | embodiment 3 | comparison 1 | comparison 2 |
|---|---|---|---|---|---|
| Tg (° C.) | 135 | 108 | 123 | 105 | 75 |
| CTE (α1, ppm/° C.) | 86 | 105 | 73 | 115 | 120 |
| peel strength (kg/cm$^2$) | 0.92 | 0.85 | 0.84 | 1.04 | 1.01 |
| Dk (1M/1 G) | 3.5/3.42 | 3.3/3.2 | 3.22/3.05 | 4.2/4.15 | 4.05/4.01 |
| Df (1M/1 G) | 0.0075/0.0072 | 0.0063/0.006 | 0.0055/0.0053 | 0.015/0.013 | 0.011/0.0102 |
| epoxy resin | 100 g | 100 g | 100 g | 100 g | 100 g |
| carboxylated nitrile butadiene rubber | 0 | 0 | 0 | 40 g | 40 g |
| polybutadiene styrene divinylbenzene graft terpolymer resin | 20 g | 30 g | 40 g | 0 | 0 |
| DTBHQ | 6 g | 2 g | 6 g | 26 g | 6 g |
| polyphenyl ether modified cyanate ester resin | 15 g | 30 g | 45 g | 0 | 0 |
| inorganic filler | 60 g | 110 g | 130 g | 100 g | 100 g |
| chain extending sealing agent | 4 g | 4 g | 4 g | 4 g | 4 g |
| catalyst | 0.50 g | 0.50 g | 0.50 g | 0.25 g | 0.25 g |
| peroxide | 5 g | 5 g | 5 g | 0 | 0 |

A comparison of the above embodiments and the above comparisons reveals that the resin composition includes polybutadiene styrene divinylbenzene graft terpolymer resin and polyphenyl ether modified cyanate ester resin to thereby reduce the coefficient of thermal expansion, dielectric constant (Dk), and dielectric dissipation factor (Df) efficiently.

Therefore, the resin composition in the embodiments of the present invention has a low coefficient of thermal expansion and therefore has the desired thermal stability, such that the resin composition is applicable to a high-temperature process, manifests enhanced heat resistance and storage stability, and prevents performance deterioration otherwise caused by heat generated during operation and duty cycle temperature. As regards dielectric properties, the resin composition in the embodiments has a low dielectric constant (Dk) and dielectric dissipation factor (Df) and therefore is conducive to improving dielectric properties and reducing energy transfer loss.

As described above, the present invention meets the three requirements of patentability, namely novelty, non-obviousness, and industrial applicability. Regarding novelty and non-obviousness, the present invention discloses a resin composition characterized by specific ingredients and proportions thereof to attain high heat resistance, low dielectric constant (Dk), low dielectric dissipation factor (Df), and being halogen-free, and therefore is applicable to protective film of printed circuit boards, insulating protective film of electronic components, and resin insulation film of leadframes. Regarding industrial applicability, products derived from the present invention meet market demands fully.

The present invention is disclosed above by preferred embodiments. However, persons skilled in the art should understand that the preferred embodiments are illustrative of the present invention only, but should not be interpreted as restrictive of the scope of the present invention. Hence, all equivalent variations and replacements made to the aforesaid embodiments should fall within the scope of the present invention. Accordingly, the legal protection for the present invention should be defined by the appended claims.

What is claimed is:

1. A resin composition, comprising:
   (A) 100 parts by weight of epoxy resin;
   (B) 20 to 100 parts by weight of polybutadiene styrene divinylbenzene graft terpolymer resin;
   (C) 2 to 20 parts by weight of di-tert-butylhydroquinone (DTBHQ); and
   (D) 5 to 50 parts by weight of polyphenyl ether modified cyanate ester resin,
   wherein the resin composition further selectively comprises at least one of (E) inorganic filler, (F) chain extending sealing agent, and (G) catalyst.

2. The resin composition of claim 1, wherein the (E) inorganic filler is contained in an amount of 10 to 150 parts by weight.

3. The resin composition of claim 1, wherein the (F) chain extending sealing agent is contained in an amount of 0.1 to 25 parts by weight.

4. The resin composition of claim 1, wherein the (G) catalyst is contained in an amount of 0.001 to 10 parts by weight.

5. The resin composition of claim 1, wherein the epoxy resin comprises at least one selected from the group consisting of bisphenol A epoxy resin, bisphenol F epoxy resin, bisphenol S epoxy resin, phenol novolac epoxy resin, bisphenol A novolac epoxy resin, o-cresol novolac epoxy resin, trifunctional epoxy resin, tetrafunctional epoxy resin, multifunctional epoxy resin, dicyclopentadiene (DCPD) epoxy resin, phosphorus-containing epoxy resin, p-xylene epoxy resin, naphthalene epoxy resin, benzopyran epoxy resin, biphenyl novolac epoxy resin, phenol aralkyl novolac epoxy resin, silicon-containing epoxy resin, fluorine-containing epoxy resin, boron-containing epoxy resin, titanium-containing epoxy resin, epoxidized polybutadiene resin, polyester epoxy resin, and maleimide-containing epoxy resin.

6. The resin composition of claim 1, wherein the inorganic filler comprises at least one selected from the group consisting of silicon dioxide, aluminum oxide, aluminum hydroxide, magnesium oxide, magnesium hydroxide, calcium carbonate, aluminum nitride, boron nitride, aluminum silicon carbide, silicon carbide, sodium carbonate, titanium dioxide, zinc oxide, zirconium oxide, quartz, diamond powder, diamond-like powder, graphite, magnesium carbonate, potassium titanate, ceramic fiber, mica, boehmite, zinc molybdate, ammonium molybdate, zinc borate, calcium phosphate, calcinated talc, talc, silicon nitride, mullite, calcinated kaolin clay, clay, basic magnesium sulfate whisker, mullite whisker, barium sulfate, magnesium hydroxide whisker, magnesium oxide whisker, calcium oxide whisker, carbon nanotube, and powder particles having an organic core and a shell modified by an insulator.

7. The resin composition of claim 6, wherein the silicon dioxide comprises at least one selected from the group consisting of hollow porous spherical silicon dioxide and solid porous spherical silicon dioxide.

8. The resin composition of claim 1, wherein a chemical structure of the chain extending sealing agent is expressed by at least one selected from the group consisting of:

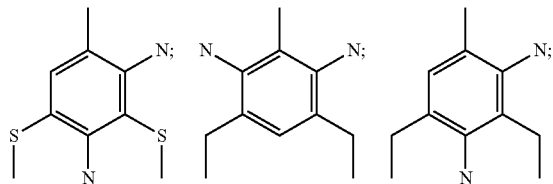

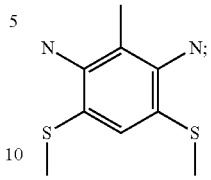

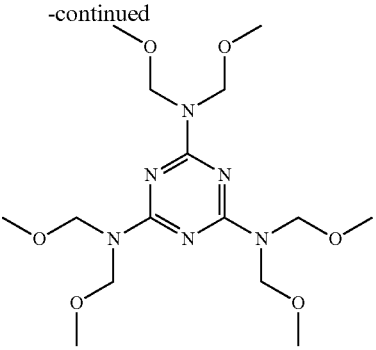

9. The resin composition of claim 1, wherein the catalyst comprises at least one selected from the group consisting of phenylphosphine borate catalyst, boron trifluoride amine complex, ethyltriphenyl phosphonium chloride, 2-methylimidazole (2MI), 2-phenylimidazole (2PZ), 2-ethyl-4-methylimidazole (2E4MI), triphenylphosphine (TPP), 4-dimethylaminopyridine (DMAP), urea catalyst, imidazole epoxy complex, and metallic salts of manganese, iron, cobalt, nickel, copper, or zinc.

10. The resin composition of claim 9, wherein the phenylphosphine borate catalyst is tetraphenylphosphonium tetraphenylborate.

11. The resin composition of claim 1, further comprising at least one of a peroxide and/or a solvent.

12. An insulation film, comprising the resin composition of claim 1.

13. A circuit board, comprising the insulation film of claim 12.

* * * * *